United States Patent [19]

Vora et al.

[11] Patent Number: 5,120,826
[45] Date of Patent: * Jun. 9, 1992

[54] POLYAMIDE-IMIDE POLYMERS HAVING FLUORINE-CONTAINING LINKING GROUPS

[75] Inventors: Rohitkumar H. Vora, Westfield; Paul N. Chen, Sr., Gillette, both of N.J.

[73] Assignee: Hoechst Celanese Corp., Somerville, N.J.

[*] Notice: The portion of the term of this patent subsequent to Apr. 28, 2009 has been disclaimed.

[21] Appl. No.: 631,559

[22] Filed: Dec. 21, 1990

[51] Int. Cl.$^5$ .................... C08G 69/26; C08G 69/28; C08G 73/14
[52] U.S. Cl. .................... 528/350; 528/26; 528/28; 528/33; 528/125; 528/128; 528/170; 528/172; 528/173; 528/179; 528/188; 528/220; 528/229; 528/337; 528/342; 528/352; 528/353
[58] Field of Search .......... 528/350, 353, 125, 128, 528/170, 173, 172, 342, 179, 26, 28, 188, 185, 33, 220, 229, 352

[56] References Cited

U.S. PATENT DOCUMENTS

| | | | |
|---|---|---|---|
| 3,328,352 | 6/1967 | Kwolek | 528/185 |
| 3,347,828 | 10/1967 | Stephens et al. | 528/182 |
| 3,449,296 | 6/1969 | Angelo et al. | 528/26 |
| 3,494,890 | 2/1970 | Morollo | 528/179 |
| 3,661,832 | 5/1972 | Stephens | 528/188 |
| 3,920,612 | 11/1975 | Stephens | 528/188 |
| 4,167,620 | 9/1979 | Chen | 528/350 |
| 4,713,438 | 12/1987 | Harris | 528/337 |
| 4,877,653 | 10/1989 | Vora et al. | 428/473.5 |
| 4,914,180 | 4/1990 | Vora | 528/344 |
| 4,952,669 | 8/1990 | Vora | 528/353 |
| 4,954,610 | 9/1990 | Chen, Sr. et al. | 528/353 |
| 4,954,611 | 9/1990 | Chen, Sr. et al. | 528/353 |
| 4,962,183 | 10/1990 | Chen, Sr. et al. | 528/353 |
| 4,978,737 | 12/1990 | Vora | 528/353 |
| 4,978,742 | 12/1990 | Vora et al. | 528/176 |
| 5,025,089 | 6/1991 | Vora et al. | 528/353 |
| 5,026,822 | 6/1991 | Vora | 528/353 |

Primary Examiner—John Kight, III
Assistant Examiner—P. Hampton-Hightower
Attorney, Agent, or Firm—J. M. Hunter, Jr.

[57] ABSTRACT

The present invention provides for a novel heat stable class of polyamide-imide polymers having excellent flow properties and hydrolytic stability which are prepared by forming the polycondensation product of one or more aromatic or aliphatic diamines and a comonomer comprising a tri- or hexafluoro-substituted tricarboxylic acid anhydride (or acid derivative thereof) having the structure:

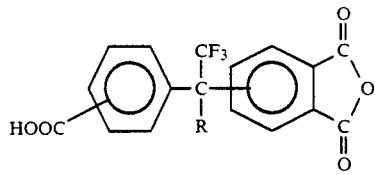

wherein R is CF$_3$ or a phenyl radical. In addition to improved flow properties, the polyamide-imide polymers of this invention also exhibit improved solubility properties in most organic solvents, good resistance to attack by chlorinated solvents such as trichloroethylene as compared with polyimides, improved hydrophobic properties as well as good thermal properties, including resistance to thermooxidative degradation.

19 Claims, No Drawings

POLYAMIDE-IMIDE POLYMERS HAVING FLUORINE-CONTAINING LINKING GROUPS

BACKGROUND OF THE INVENTION

1. Field of the Invention

The present invention relates to aromatic polyamide-imide polymers containing the hexafluoroisopropylidine or a 1-phenyl-2,2,2-trifluoroethane linking group having improved physical and chemical properties, and to a method for preparing such polymers.

2. Description of Related Art

Polyamide-imide polymers and copolymers are known in the art. These materials are generally prepared by the condensation polymerization of trifunctional acid monomers such as the 4-acid chloride of trimellitic anhydride (4-TMAC) and one or more aromatic diamines. Examples of such polyamide-imide polymers are disclosed in U.S. Pat. Nos. 3,347,828, 3,494,890, 3,661,832, 3,920,612 and 4,713,438.

These polymers may be characterized by extremely good high temperature properties (Tg of about 275° C. or higher), good high temperature stability, good tensile strength at high temperatures, good mechanical properties and good chemical resistance. These polyamide-imides are useful as wire enamel coatings, laminates, molded products, films, fibers, impregnating varnishes and in other applications where high thermal stability is required.

One of the problems associated with such polymers is that they exhibit generally poor flow properties which render them difficult to process, particularly to injection mold or to spin into fibers. These polymers are also relatively hydrophilic and tend to absorb moisture which can effect their clarity, heat stability, processability, mechanical and electrical properties.

Applicants' copending U.S. Pat. application Ser. No. 07/316,380, filed in the USPTO on Feb. 27, 1989 now U.S. Pat. No. 4,954,610 polyamide-imide polymers prepared by forming the polymer condensation product of 4-TMAC and one or more diaryl diamines containing a tri or hexafluoroisopropylidene group linking the two aromatic moieties. Such polyamide-imide polymers exhibit enhanced solvent solubility and thermal stability and improved flow properties, as well as improved hydrophobic properties when compared with their counterparts which do not contain the tri or hexafluoroisopropylidene linking groups.

SUMMARY OF THE INVENTION

The present invention provides for a novel heat stable class of polyamide-imide polymers having excellent flow properties and hydrolytic stability which are prepared by forming the polycondensation product of one or more aromatic or aliphatic diamines and a comonomer comprising a tri- or hexafluoro-substituted tricarboxylic acid anhydride (or acid derivative thereof) having the structure:

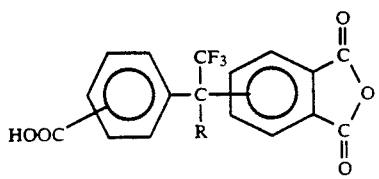

wherein R is $CF_3$ or a phenyl radical. In addition to improved flow properties, the polyamide-imide polymers of this invention also exhibit improved solubility properties in most organic solvents, good resistance to attack by chlorinated solvents such as trichloroethylene as compared with polyimides, improved hydrophobic properties as well as good thermal properties, including resistance to thermooxidative degradation.

DETAILED DESCRIPTION OF THE INVENTION

The polyamide-imide polymers of the present invention may be characterized as containing one or more structural units of the formula:

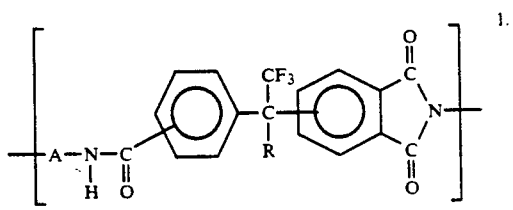

wherein A is a divalent aromatic or aliphatic moiety, R is selected from the group consisting of $CF_3$ or

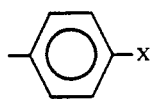

wherein x is a non interfering monovalent substituent selected from the group consisting of hydrogen, chloro, fluoro, $C_1$ to $C_4$ alkyl, $C_1$ to $C_4$ alkoxy, hydroxy and phenyl, and wherein said polymer is further characterized as having a polyamide-imide inherent viscosity of at least about 0.05 dl/g. as measured from a solution of the polymer in dimethyl acetamide at 25° C. at a polymer concentration of 0.5 weight percent. In the more preferred embodiment of this invention, the preferred minimum inherent viscosity of the polymer is at least about 0.1 dl/g and may range up to about 6 dl/g.

As indicated above, A may be the divalent residium of one or a combination of aliphatic or cycloaliphatic diamines. Preferred such aliphatic diamines are linear or branched diamino alkanes or alkenes having the formula 2:

$$H_2N-A_1-NH_2 \qquad 2.$$

wherein $A_1$ contains from 2 to about 20 carbon atoms. Examples of preferred diamines are ethylene diamine, 1,2 diamino propane, 1,10 diaminodecane, 1,12 diamino dodecane, 1,2 diamino-2-methylpropane and like materials.

In the more preferred embodiment of this invention, A is the divalent residuum of one or a combination of aromatic diamines having the formula 3:

$$H_2N-A_2-NH_2 \qquad 3.$$

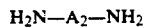

wherein $A_2$ is the aromatic residium of a phenylene, naphthalene, bis or polyphenylene compound. $A_2$ is preferably selected from:

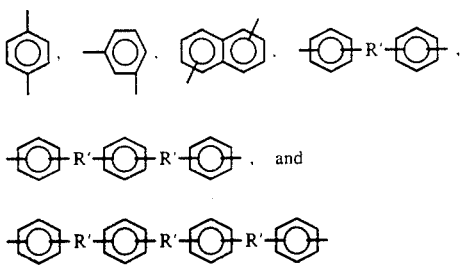

wherein R' is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes having up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene having up to 8 Si atoms, disiloxanylene, and a polysiloxanylene having up to 8 Si atoms. Preferably, the linking group R' is selected from oxy, hexafluoroisopropylidene, 1-phenyl-2,2,2-trifluoroethylidene, carbonyl, methylene, a covalent carbon to carbon bond, disiloxanylene and polysiloxanylenes. Most preferably, R' is a carbon to carbon bond, methylene, hexafluoroisopropylidene, 1-phenyl-2,2,2-trifluoroethylidene and oxy.

The hydrogen atoms of the aromatic groups $A_2$ and/or R' may be substituted by one or more non-interfering monovalent substituents such as chloro, fluoro, lower alkyl or alkoxy having up to 6 carbon atoms, hydroxy and phenyl. Also, the term "aromatic" as used herein is meant to include heteroaromatics wherein one or more of the ring atoms is replaced with —O—, —S— or —N— atoms.

Specific aromatic diamines within the scope of formula 3 above which may be employed in this invention include:
m-phenylene diamine;
p-phenylene diamine;
1,3-bis(4-aminophenyl) propane;
2,2-bis(4-aminophenyl) propane;
4,4,-diamino-diphenyl methane;
1,2-bis(4-aminophenyl) ethane;
1,1-bis(4-aminophenyl) ethane;
2,2,-diamino-diethyl sulfide;
bis(4-aminophenyl) sulfide;
2,4,-diamino-diphenyl sulfide;
bis(3-aminophenyl)sulfone;
bis(4-aminophenyl) sulfone;
4,4,-diamino-dibenz-vl sulfoxide;
bis(4-aminophenyl) ether;
bis(3-aminophenyl) ether;
3,4, diamino oxydianiline;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
2,6'-diamino-pyridine;
3,5-diamino-pyridine;
1.3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl]hexafluoropropane;
2,2-bis[4-(2-chloro-4-aminophenoxy)phenyl] hexafluoropropane;
1,1-bis(4-aminophenyl)-1-phenyl-2,2,2-trifluoroethane;
1,1-bis[4-(4-aminophenoxy)phenyl]-1-phenyl-2,2,2-tri fluoroethane;
1,4-bis(3-aminophenyl)buta-1-ene-3-yne;
1,3-bis(3-aminophenyl) hexafluoropropane;
4,4'-bis[2-(4-aminophenoxyphenyl) hexafluoroisopropyl] diphenyl ether;
1,5-bis(3-aminophenyl) decafluoropentane; and mixtures thereof.

The most preferred aromatic diamines are those where $A_2$ in formula 3 above is a moiety of the formula:

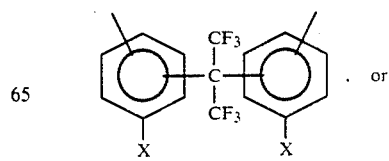 . or

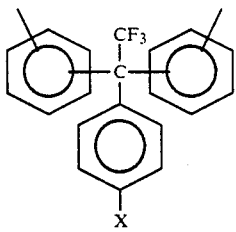

wherein x is independently selected from the groupings listed above. Preferred of such diamines include:

2,2-bis(3-aminophenyl) hexafluoropropane;
2,2-bis(4-aminophenyl) hexafluoropropane;
2-(3-aminophenyl)-2-(4-aminophenyl) hexafluoropropane;
2,2 bis(3-amino-4-methylphenyl) hexafluoropropane; the
1-phenyl-2,2,2-trifluoroethane counterparts thereof; and mixtures thereof with one or more of the non-fluorine containing diamines set forth above.

Mixtures of aromatic and aliphatic diamines as defined above may also be employed in preparing the polyamide-imide polymers of this invention.

The most preferred polyamide-imide polymers of this invention are prepared by forming the polymer condensation product of hexafluoro-2-(3,4 carboxyanhydrophenyl)-2-(4-carboxyphenyl) propane (6F-TMA) having the structure:

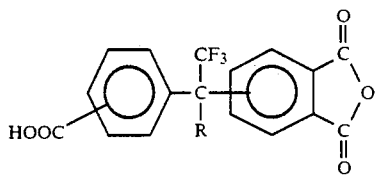

and an aromatic diamine having the structure:

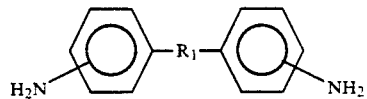

wherein $R_1$ is as set forth above to yield polyamide-imide polymers having at least one recurring group of the structure of formula 4:

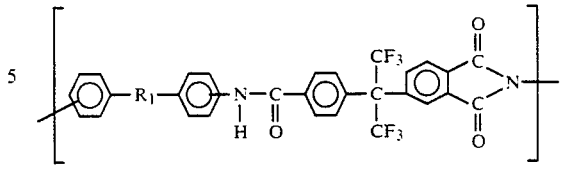

Polyamide-imide copolymers may also be prepared from a mixture of from about 5 to 95 mole percent of the tri- or hexafluoro-substituted tricarboxylic acid anhydride and from about 95 to 5 mole percent of a different tricarboxylic acid anhydride including compounds having the general formula:

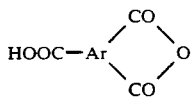

wherein Ar is a trivalent aromatic radical.
Ar is preferably:

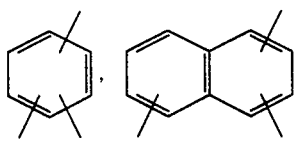

or isomers thereof, and

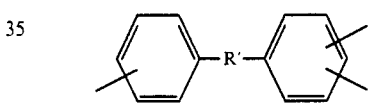

wherein R' is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes having up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene having up to 8 Si atoms disil- oxanylene, and a polysiloxanylene having up to 8 Si atoms.

The use of such tricarboxylic acid anhydrides in combination with the fluorine-containing acid anhydride serves to modify the solubility, processability and thermal properties of the polyamide-imide such that these properties may be tailored to suit specific applications. Preferred copolyamide-imide polymers within this embodiment are those having the structure of formula 5:

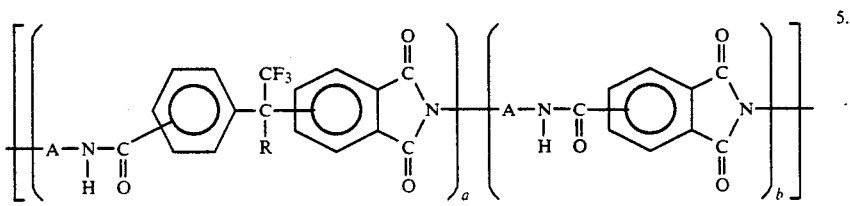

wherein A is $A_1$ or $A_2$ as defined above, R is as defined above and the terms (a) and (b) are equal to the mole fraction of each recurring unit in the polymer chain and (a) ranges from about 0.05 to about 0.95, (b) ranges from about 0.95 to about 0.05, with the proviso that the sum of (a) and (b) is equal to 1.00.

Amine reactive monoacid derivatives of the fluorine and non-fluorine containing tricarboxylic acid anhydrides may also be employed in preparing the polyamide-imide polymers and copolymers. Typical derivatives are the monoacid halides, particularly chlorides.

The preferred tricarboxylic acid monoanhydrides have the carboxyl groups in the anhydride ring paired on adjacent carbon atoms of the aromatic nucleus. The preferred fluorine-containing monoanhydride is hexafluoro-2-(3,4 carboxy-anhyddrophenyl)-2-(4-carboxyphenyl) propane (6F-TMA) or its mono acid chloride derivative (6F-TMAC) and the preferred non-fluoring containing monoanhydride is 4-trimellitic acid anhydride (TMA) or its mono acid chloride derivative (TMAC).

The monomers employed in this invention, particularly those containing fluorine, are preferably substantially electronically pure and are referred to as electronic grade monomers. They generally should be at least about 98.5% pure, more preferably at least about 99.5% pure.

The polyamide-imide polymers of this invention are prepared by known methods, e.g., solution or interfacial polymerization methods as disclosed in U.S. Pat. Nos. 3,328,352 and 3,449,296, the disclosures of which are incorporated by reference. Where the starting acidic monomer is in the free acid form, the process is typically a high-temperature solution condensation method employing a condensation catalyst such as paratoluene sulfonic acid or methane sulfonic acid. The reaction is preferably conducted under substantially anhydrous conditions and for a time and at a temperature sufficient to provide at least 50%, preferably at least 90%, of the corresponding polyamic acid-polyamide which may be then converted from the polyamic acid-polyamide to the polyamide-imide. Such conversions may be accomplished by adding a suitable dehydration agent such as polyphosphoric acid, acetic anhydride or a mixture thereof combined with beta-picoline or pyridine to the polyamic acid reaction media and stirring said mixture at room temperature until imidization is substantially complete. Imidization may also be accomplished by heating the polyamic acid solution or by forming a cast film of the polyamic acid and stepwise heating the film from about 70 degrees Celsius to about 300 degrees Celsius over a period of about 1 to 3 hours.

Where the starting acidic monomer is in the form of the mono acid halide, the solution polymerization process may be carried out at lower temperatures, preferably less than 35° C., with or without the use of a condensation catalyst such as triethyl amine and under anhydrous, isothermal polymerization conditions. This process tends to give rise to polymers having a higher molecular weight. The intermediate polyamic acid reaction product may then be imidized by chemical or heat treatment as set forth above.

Suitable solvents for use in the process include organic solvents whose functional groups do not react with the reactants to any appreciable extent. In addition to being inert to the system, and preferably, being a solvent for the polyamide-imide, the organic solvent must be a solvent for at least one of the reactants, preferably for all of the reactants. The normally liquid organic solvents of the N,N,dialkylcarboxylamide class are useful as solvents in the process. The preferred solvents are the lower molecular weight members of this class, particularly N,N-dimethylformamide and N,N-dimethylacetamide. Other useful solvents are N,N-diethylformamide, N,N-diethylacetamide, N,N-dimethylmethoxyacetamide, N-methyl caprolactam, and the like. Other solvents which may be used include dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone and phenols such as m-cresol. The solvents can be used alone or in combinations.

The polymers may be recovered from solution by precipitation in water or in an alcohol such as methanol, and washed.

The degree of polymerization of the polyamide-imides is subject to deliberate control. The use of equimolar amounts of the reactants under the prescribed conditions provides polyamide-imides or reasonably high molecular weight. The use of either reactant in large excess limits the extent of polymerization. In addition to using an exces of one reactant to limit the molecular weight of the polyamide-imides, a chain terminating agent such as phthalic anhydride may be used to "cap" the ends of the polymer chains. Typical useful capping agents are monoanhydrides or monoamines such as phthalic anhydride, aniline or p-methylaniline.

The quantity of organic solvent used in the process need only be sufficient to dissolve enough of one reactant, preferably the diamine, to initiate the reaction of the diamine and other monomers. It has been found that the most successful results are obtained when the solvent represents at least 60% of the final solution, that is, the solution should contain 0.05-40% of the polymeric component, more preferably 15 to 25%.

The following examples are illustrative of the invention.

EXAMPLE 1

This example sets forth the preparation of hexafluoro-2-(3,4-carboxy anhydrophenyl) -2-(4-carboxyphenyl) propane (6F-TMA) as well as the monoacid halide and the tri methyl ester.

(a) A one liter stainless steel autoclave was charged with 272 g. of 2(3,4-dimethylphenyl) -hexafluoro-isopropanol-2 and 110 g. of toluene. 200 g. of HF were added and the reaction mixture heated at 115° C. for 24 hours. After cooling to 80° C., the HF was distilled off and 200 g. of toluene was added. The solution was transferrd to a separation funnel, washed several times with water until the aqueous layer showed neutral reaction. The organic layer was dried over calcium chloride. The product was isolated by distillation under reduced pressure; 287 g. of hexafluoro-2(4-methylphenyl)-2 (3,4-dimethylphenyl) propane was recovered as a colorless liquid, b.p. 131°–134° C.

(b) A one liter stainless steel autoclave, equipped with thermometer, stirrer and gas inlet tube was charged with 138.5 g. of the 6F-trimethyl compound produced in step (a), 2.49 g of cobalt (II) acetate tetrahydrate, 0.52 g. sodium bromide and 450 g. of acetic acid. The reaction mixture was heated to 140° C. under agitation, and then a stream of air was bubbled through the stirred solution. The temperature of the mixture rose to 180° C. After 35 minutes, the exothermic reaction began to abate and the temperature was kept at 175° C. for an additional 45 minutes by heating. After cooling, the reaction mixture was transferred to a round bottom flask and 2.52 g. of oxalic acid were added. The mixture was refluxed for 1 hour. The solution was then filtered, the acetic acid distilled off and the residue was dissolved in 200 g. of 0.1 N HCl by heating. On cooling to room temperature, the crystalline product was precipitated and isolated by filtration, washed with cold water and dried in a vacuum at 80° C.; 153 g. of hexafluoro-2(4-carboxyphenyl)-2 (3,4-dicarboxyphenyl) propane was recovered as a white crystal, m.p. 140°-150° C.

(c) 87.2 g. of the 6F-tricarboxylic acid of step (b) was suspended in 300 ml of tetrahydronaphthalene in a one liter round bottom flask equipped with a Dean-Stark trap and condenser. The mixture was heated to reflux whereupon water separated and a clear solution was formed. After the theoretical amount of water was collected, the solution was slowly cooled. A crystalline product began to crystallize below 70° C., which was then isolated by filtration, washed with n-hexane and dried in a vacuum overnight at 150° C.; 77.7g. of hexafluoro-2-(3,4-carboxyanhydrophenyl) -2-(4-carboxyphenyl) propane was recovered as a white crystal, m.p. 208°-209° C.

EXAMPLE 2

The trimethyl ester of 6F-TMA was prepared as follows: 20 g. of 6F-TMA as produced in Example 1 was dissolved in 100 ml. of dry methanol. One ml. of conc. $H_2SO_4$ was added and the solution was refluxed for 16 hours. The solvent was distilled off and the residue dissolved in 100 ml. of ethyl acetate. This solution was then washed with bicarbonate solution and subsequently with water and dried over sodium sulfate; 17.45 g. of hexafluoro-2-(3,4-di-methoxycarbonylphenyl) -2-(4-methoxycarbonylphenyl) propane was recovered as a clear colorless liquid.

EXAMPLE 3

The monoacid chloride of 6F-TMA was prepared as follows: 30g of 6F-TMA as produced in Example 1 was refluxed with 100 ml of thionylchloride mixed with a catalytic amount (0.5 ml) of dimethylformamide. The mixture was refluxed an additional 30 minutes after cessation of gas formation. The solvent was distilled off and the residue was dissolved in and recrystallized from n-hexane. The crystals were washed in water and dried to yield hexafluoro-2-(3,4-carboxyanhydrophenyl) -2-(4-chlorocarbonylphenyl) propane yield 31 g., M.P. 92°-94° C.

EXAMPLE 4

This example sets forth the preparation of a polyamide-imide polymer from 6F-TMA (99% pure) and 2,2-bis(4-aminophenyl) hexafluoropropane (100% pure), hereinafter referred to as 4,4'-6F Diamine, said polymer having recurring units of structure:

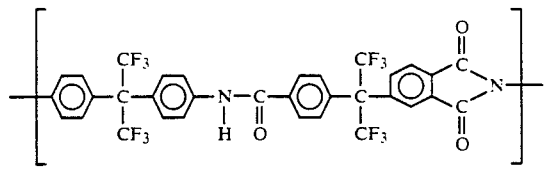

250 ml. three neck flask equipped with a stirrer, Dean Stark trap, condensor, thermometer, thermo-watch timer, nitrogen blanket and heating mantal was charged with 6.685 g. (0.02 mole) of the 4,4'-6F Diamine and 8.531 g. (0.02 mole) of the 6F-TMA as prepared in Example 1. Also charged were 0.02 g. of para toluene sulfonic acid monohydrate (PTSA) as a condenstaion catalyst and 137 g. of N-methyl pyrrolidone (NMP) to form a solution having a total solids content of about 15.22 g. The mixture was stirred under nitrogen atmosphere until a clear solution was formed and then heated under nitrogen to reflux at a temperature of about 200° C. for a period of 3 hours, at which time water and about 80% of the NMP had distilled out. The mixture was then cooled to room temperature after which deionized water was added to precipitate the polymer. The brown precipitate was washed with de-ionized water and dried overnight in a vacuum oven at 90° C. Properties of the recovered polymer are listed in Table 1.

EXAMPLE 5

This example sets forth the preparation of polyamide-imide polymer from 6F-TMA and oxy dianiline (100% pure), hereinafter referred to as ODA, said polymer having repeating units of the structure:

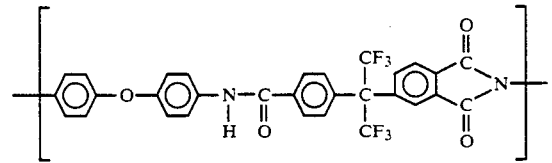

The process of Example 4 was repeated as set forth therein except that the ingredients charged to the reactor were 4.00 g. (0.02 mole) of ODA, 8.53 g. (0.02 mole) of 6F-TMA, 113 g. of NMP and 0.02 g. of PTSA.

Properties of the recovered polymer are listed in Table 1.

EXAMPLE 6

This example sets forth the preparation of a polyamide-imide copolymer based on a mixture of 6F-TMA and trimellitic anhydride monoacid chloride (99% pure), hereinafter referred to as TMAC. The described process is a low temperature process. The copolymer prepared by this process has repeating units of the following structure:

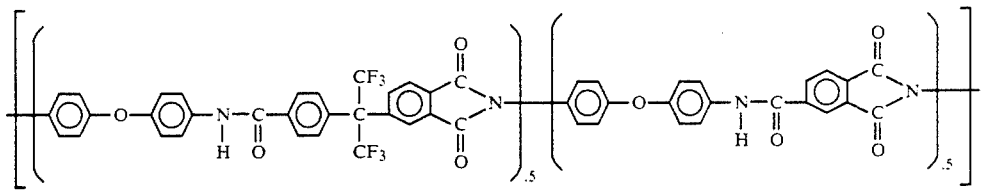

A 200 ml 3 neck flask, fitted with a stirrer, condenser, Y tube, powder addition funnel, thermometer, dry ice-acetone cooling bath and nitrogen blanket was charged under nitrogen atmosphere with 4.00 grams (0.02 moles) of ODA along with 15 grams of reagent grade dimethyl acetamide (DMAC). The mixture was stirred to dissolve the ODA and cooled down to a temperature of about $-10°$ C. About 6.39 grams of a mixture of 2.13 g (0.01 mole) of TMAC and 4.27 g (0.01 mole) of 6F-TMA was gradually added to this solution over a period of about 20 minutes time while continuing agitation and maintaining a temperature of about $-5°$ C. under nitrogen atmosphere. The container from which the acid monomers were added was rinsed with an additional 19 g. of DMAC and this was added to the polymerization solution. The temperature of the solution was allowed to rise to 5° C. and 2.02 grams (0.02 mole) of triethylamine was charged dropwise over about 18 minutes time under nitrogen atmosphere while continuing agitation. The reaction mass was then agitated at a temperature of 15° C. for three hours. Thereafter, 7.91 grams (0.1 mole) of pyridine and 10.02 grams of acetic anhydride (0.1 mole) was charged under nitrogen atmosphere and the reaction mass was allowed to agitate for about 12 hours at 20° C. to complete cyclization. The reaction mass was filtered to remove pyridine hydrochloride. The polymer was precipitated from solution using de-ionized water. The resulting polymer was then washed with de-ionized water, and chopped to a fine powder as an aqueous suspension in a mechanical blender. The powder was dried overnight in a vacuum oven at 160° C.

Properties of the recovered polymer are listed in Table 1.

TABLE 1

| Example | Inherent Viscosity (dl/gm.) | Intrinsic Viscosity | GPC $M_w$ | GPC $M_n$ | d | DSC (Tg-°C.) | TGA (5% wt. loss at) |
|---|---|---|---|---|---|---|---|
| 4 | 0.10 | 0.06 | 2800 | 860 | 3.3 | 160.5 | 300° C. |
| 5 | 0.15 | 0.10 | 5600 | 2200 | 2.6 | 138 | 300° C. |
| 6 | 0.16 | 0.15 | 5280 | 1020 | 5.3 | 151 | 260° C. |

The weight average molecular weight ($M_w$) and number average molecular weight ($M_n$) of the polymer of example 2 was measured by gel permeation chromatography (GPC) performed on dilute solutions of the polymer in dimethylacetamide (DMAC). The actual apparatus employed consisted of a Waters (Millipore Corp.) programmable automatic sampler, vacuum pump, chromatography columns with heater, and a differential refractometer connected to a Shimadzu CR 30A data reduction system with accompanying software (version 1.1, Shimadzu part No. T/N 22301309-91). The refractometer used was a Waters model 410 and four chromatography columns, 500 Angstron, 1000 Angstron, 10,000 Angstron and 100,000 Angstron (available from Waters) were connected in series. The system was calibrated using multiple available polystyrene standards ranging in molecular weight as follows:

| GPC CALIBRATION | |
|---|---|
| Calibration Standard (Polystyrene) | Mol. Wt. |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the relative (relative to polystyrene standards) weight average molecular weight $M_w$, the relative number average molecular weight and polydispersity $M_w/M_n$ (d) were obtained for polymers produced in accordance with the Examples given hereinabove.

Glass transition temperatures (Tg) were determined by differential scanning calorimetry using a Perkin Elmer DSC-4 calorimeter operating at 20° C./min , nitrogen atmosphere at 60cc/min. Glass transition temperature by this method is generally defined as the point of intersection of tangent lines about the point of first inflection of the heating curve of the polymer. Thermogravimetric analysis (TGA) was performed with a Perkin Elmer 65-2 analyzer at 20° C./min. with an air rate of 80cc/min. TGA values given herein are for five percent weight loss; in other words, the temperature at which 5% weight loss is observed is reported.

As can be seen from the data of Table 1, the polyamide-imide polymers of the present invention have relatively high heat stability as measured by TGA while at the same time relatively low glass transition temperatures. This means that they may be readily processed by conventional molding equipment because of enhanced flow properties.

The polyamide-imides of the present invention may be used in their preimidized form (polyamide-polyamic acid) as solutions in organic solvent to produce films, coatings, composites and the like which may be cured in-situ to form the polyamide-imide by the application of heat.

The polyamide-imides may be molded using techniques such as compression molding or injection molding to produce melt fabricated articles such as fibers, films, safety masks, windshields, electronic circuit substrates, or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polyamide-imides may also be compounded with friction materials to produce molding compounds for high temperature braking components or with abrasive materials such as diamonds for high speed grinding wheels.

The polyamide-imides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and -photoresist coatings useful in microelectronic processing.

The polyamide-imides may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polyamide-imides may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A polyamide-imide polymer containing at least one recurring structural unit of the formula:

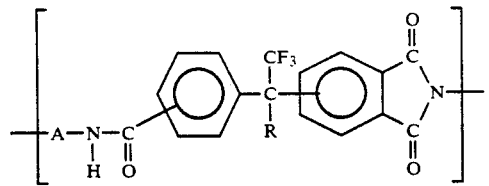

wherein A is a divalent aromatic or aliphatic moiety, R is selected from the group consisting of CF₃ or

wherein X is a non-interfering monovalent substituent selected from the group consisting of hydrogen, chloro, fluoro, C₁ to C₄ alkyl, C₁ to C₄ alkoxy, hydroxy and phenyl, and wherein said polymer is further characterized as having a polyamide-imide inherent viscosity of at least about 0.05 as measured from a solution of the polymer in dimethyl acetamide at 25° C. at a polymer concentration of 0.5 weight percent.

2. The polymer of claim 1 having the structure:

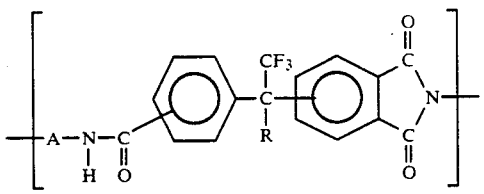

3. The polymer of claim 2 wherein A is the aromatic residuum of a phenylene, naphthalene, bis or polyphenylene compound selected from:

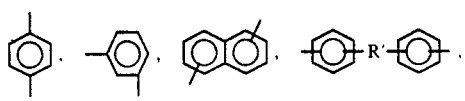

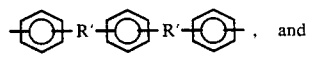, and

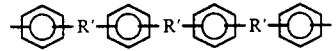

wherein R' is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes having up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene having up to 8 Si atoms disil- oxanylene, and a polysiloxanylene having up to 8 Si atoms.

4. The polymer of claim 3 where R is CF₃.

5. The polymer of claim 3 wherein A is the aromatic residuum of a diaryl diamine having the formula:

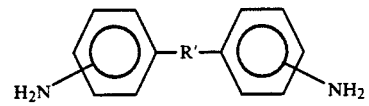

6. The polymer of claim 5 wherein R' is oxygen.

7. The polymer of claim 5 wherein R' is

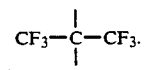

8. The polymer of claim 6 wherein R is CF₃.

9. The polymer of claim 7 wherein R is CF₃.

10. A polyamideimide copolymer containing at least one recurring unit of the structure:

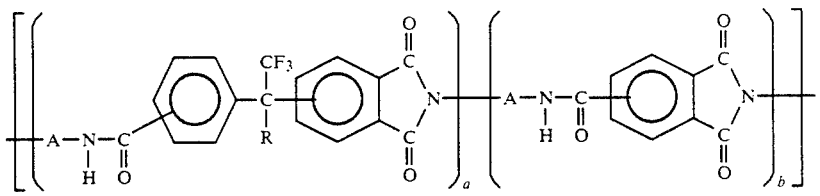

wherein A is a divalent aromatic or aliphatic moiety, R is selected from the group consisting of $CF_3$ or

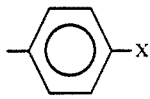

wherein X is a non-interfering monovalent substituent selected from the group consisting of hydrogen, chloro, fluoro, $C_1$ to $C_4$ alkyl, $C_1$ to $C_4$ alkoxy, hydroxy and phenyl, and wherein said polymer is further characterized as having a polyamide-imide inherent viscosity of at least about 0.05 as measured from a solution of the polymer in dimethyl acetamide at 25° C. at a polymer concentration of 0.5 weight percent, and wherein A is $A_1$ or $A_2$ as defined above, and the terms (a) and (b) are equal to the mole fraction of each recurring unit in the polymer chain and (a) ranges from about 0.05 to about 0.95, (b) ranges from about 0.95 to about 0.05, with the proviso that the sum of (a) and (b) is equal to 1.00.

11. The copolymer of claim 10 having the structure:

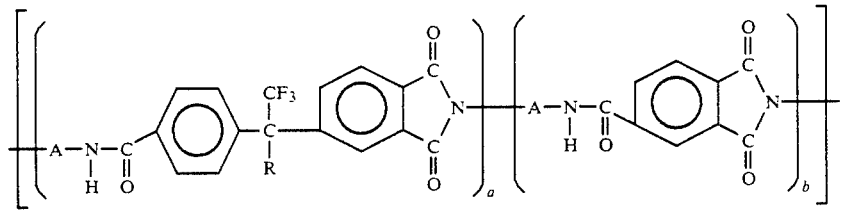

12. The copolymer of claim 11 wherein A is the aromatic residuum of a phenylene, naphthalene, bis or polyphenylene compound selected from:

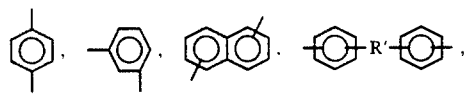

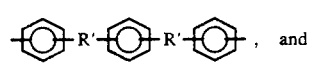, and

wherein R' is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes having up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene having up to 8 Si atoms disil- oxanylene, and a polysiloxanylene having up to 8 Si atoms.

13. The copolymer of claim 12 wherein R is $CF_3$.

14. The copolymer of claim 12 wherein A is the aromatic residuum of a diaryl diamine having the formula:

$H_2N$—⬡—R'—⬡—$NH_2$.

15. The copolymer of claim 14 wherein R' is $CF_3$—C—$CF_3$.

16. The copolymer of claim 14 wherein R' is oxygen.

17. The copolymer of claim 11 wherein (a) and (b) are each about 0.5.

18. A process for preparing a polyamide-imide polymer comprising forming the polymer condensation product of a monomer having the structure:

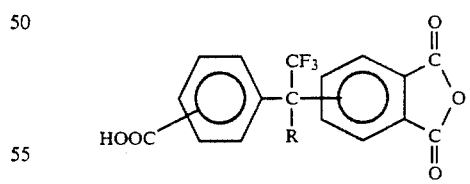

or its monoacid chloride derivative, wherein R is $CF_3$ or a phenyl radical, and a diamine having the formula $H_2N$-A-$NH_2$ wherein A is a divalent aliphatic or aromatic moiety.

19. The process of claim 1 wherein R is $CF_3$.

* * * * *